Aug. 28, 1923.
G. E. FENNER
ARTIFICIAL BAIT
Filed Aug. 12, 1922
1,466,616
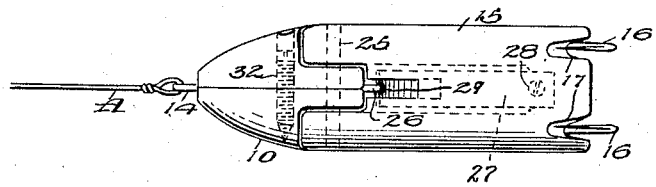
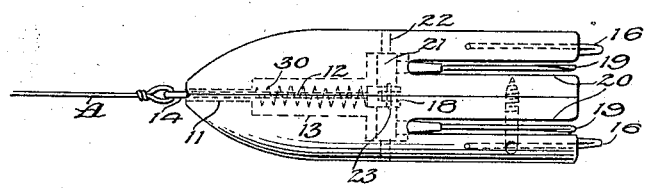
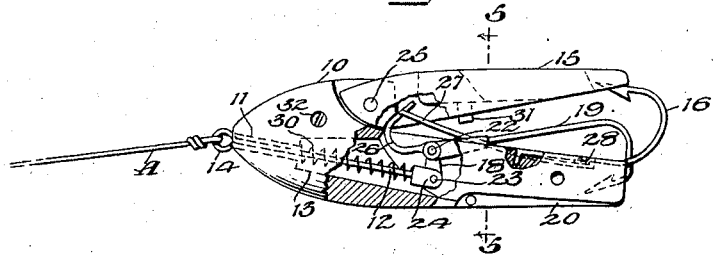
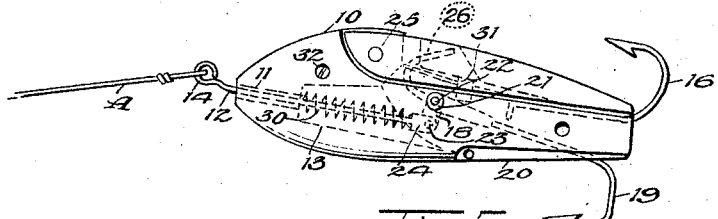
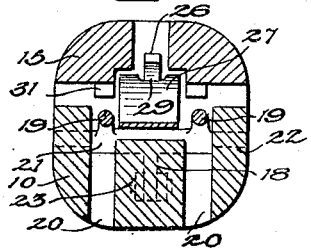
WITNESSES
H. J. Walker
J. L. McAuliffe
INVENTOR
George E. Fenner
BY
ATTORNEYS Patented Aug. 28, 1923.

1,466,616

UNITED STATES PATENT OFFICE.

GEORGE E. FENNER, OF OXFORD, WISCONSIN.

ARTIFICIAL BAIT.

Application filed August 12, 1922. Serial No. 581,528.

*To all whom it may concern:*

Be it known that I, GEORGE E. FENNER, a citizen of the United States, and a resident of Oxford, in the county of Marquette and State of Wisconsin, have invented a new and Improved Artificial Bait, of which the following is a description.

My invention relates to an artificial fishing bait, and more particularly to a bait in which the hooks are ordinarily guarded and the barbs thereof covered, but which become exposed upon the bait being taken by a fish.

The general object of my invention is to provide an artificial bait equipped with hooks and novel means whereby the hooks will be positively caused to hook into the fish upon the bait being attacked.

Important objects also are to provide a weedless bait by a construction that will prevent the bait from catching on weeds; and to provide a hook and guard assemblage including means that will automatically and instantly return the hook to the protected position without action by the fisherman should the hook engage in a fish and be torn loose, the automatic action contributing to the weedless character of the bait.

The stated objects and others as will appear are attained by an artificial bait, the body of which is equipped with a hook or hooks in fixed position and guarded by a member which is sensitive to pressure by the fish and the movement of which member will release a second hook or hooks and cause the latter to be subject to a pull on the line for positively forcing the hook into the fish.

The nature of the invention and its distinguishing features and advantages will clearly appear as the description proceeds.

Reference is to be had to the accompanying drawing, it being understood that the drawing is merely illustrative of one example of the invention.

Figure 1 is a plan view of an artificial bait embodying my invention;

Figure 2 is a bottom view thereof;

Figure 3 is a side elevation partly broken away and in section with the hooks in their protected positions;

Figure 4 is a side elevation with the hooks exposed; and

Figure 5 is an enlarged cross section on the line 5—5 of Figure 3.

In carrying out my invention in accordance with the illustrated example, the bait is formed with a body 10, having a bore 11 advantageously oblique and extending from the front end of the body inwardly. A wire rod 12 extends through the bore 11 to the hollow interior 13 of the body and said rod at its front end outside of the body has an eye 14 for the attachment of the fish line A, or a snell or leader.

On the body at the top is a guard 15, pivoted at its front end to the body by a pin 25 or the like. The rear end of the element 15 serves to guard hooks 16 fixedly secured to the body 10 and projecting upwardly at the tail end of the body, the barbs of the hooks being accommodated in notches 17 in said element 15.

The inner end of the rod 12 has a forked head 24 pivoted as at 23 to an arm 18 on a hub 21 on a shaft 22 supported on the body 10 at the interior. Said hub 21 has rearwardly extending hooks 19 normally lying in longitudinal slots 20 in the body 10, but adapted to be projected beyond the slots, as in Figure 4.

On the hub 21 is secured an upwardly curved arm 26, and to the tail end of the body is secured at 28 a plate spring 27 whose inner end is curved upwardly into engagement with the guard 15 and is provided in said end with a notch 29, which receives the curved arm 26. The spring 27 serves to hold the guard outwardly to conceal the fixed hooks 16, and by its engagement with the arm 26, locks the hub 21 from turning and thereby prevents the pivoted hooks 19 from being projected beyond the body, by a pull on the line so long as the guard 15 is in normal outward position. When, however, the guard is moved inwardly the spring 27 is compressed thereby and moved into such position with respect to the arm 26 as to release the same so that the hub 21 can be turned by a pull on the line and the pivoted hooks projected. A spring 30 coiled on the rod and bearing on the head 24 yielding holds the pivoted hooks 19 in retracted position. The guard 15 is provided on its inner face with pins 31 which when the guard is pressed inward engages the pivoted hooks and swings them outwardly.

By thus constructing the bait, the fixed hooks 16 are concealed by the guard 15 until pressure is applied thereto by the fish, when it will be moved inward and the hooks 16 exposed, and at the same time the pivoted hooks 19 will be swung outwardly by the engagement of the pins 31 with the said hooks. Since the pivoted hooks 19 cannot be projected by a pull exerted on the line until the bait is taken by the fish, and the guard moved inward, the bait is prevented from catching on grass and weeds, as it is drawn through the water by the line.

The body 10 is advantageously made in two longitudinal sections secured by a transverse screw 32 or the like.

I would state in conclusion that although the illustrated form constitutes a practical embodiment of my invention, I do not wish to be understood as limiting myself to the precise details illustrated, since manifestly, the same can be considerably varied without departing from the spirit of the invention as defined in the appended claims.

I claim:

1. An artificial bait comprising a body having a fixed hook thereon, a second hook pivotally mounted on said body, an element rigid with said pivoted hook, means connecting a fish line to said element, means normally holding the pivoted hook against movement, and means to be moved by a fish and serving to release the holding means to allow said pivoted hook to move outwardly in response to a pull on the line.

2. An artificial bait comprising a body, a fixed and a pivoted hook secured thereon, means to connect said pivoted hook with a fish line to subject the same to an outward movement when the line is pulled, means to normally prevent said pivoted hook from moving outwardly and means adapted to release said first-mentioned means to allow the pivoted hook to swing outwardly by a pull on the line, said last-mentioned means constituting a guard for the fixed hook when the pivoted hook is in its retracted position.

3. An artificial bait comprising a body, a fixed and a pivoted hook mounted on said body, an arm rigid with the pivoted hook, a spring pressing against said arm and normally tending to hold the said arm and the pivoted hook against movement, means connected with the pivoted hook and adapted to be connected with a fish line, and means adapted to move inwardly when subjected to an external pressure and engaging and pressing said spring to release the arm and allow said pivoted hook to move outwardly when the line is subjected to a pull.

4. An artificial bait comprising a body, a fixed and a pivoted hook mounted thereon, means to connect the pivoted hook with a fish line to be subjected to an outward movement when the line is pulled, means to normally prevent the outward movement of the pivoted hook, and means adapted to release said first-mentioned means to allow the pivoted hook to move outwardly, said last-mentioned means constituting a guard for the fixed hook, and when actuated exposing the fixed hook.

5. An artificial bait comprising a body, a fixed and a pivoted hook arranged thereon, the pivoted hook being disposed opposite to the fixed hook, and being adapted to swing outwardly, a lateral arm rigid with said pivoted hook, a spring pressed rod pivotally secured to said arm and adapted to be connected with a fish line, a second arm also rigid with said pivoted hook, a spring engaging said second arm and normally holding the pivoted hook in its innermost position, and a guard pivoted at the forward end of the body and engaging said spring, said guard when pressed inwardly pressing said spring and releasing said second-mentioned arm to allow a free movement of the pivoted hook.

6. In an artificial bait, a fixed hook, a guard therefor movable under pressure from its normal position when the bait is taken by a fish, whereby to expose the hook, a second hook adapted to be brought into action by a pull on the line, and latch means adapted to hold said second hook against movement and to be released by the guard to permit said second hook to be operated by the line.

7. In an artificial bait, a fixed hook, a guard therefor movable under pressure from its normal protecting position, a pivotally mounted hook, said guard being mounted independently of the hooks and adapted to move the pivoted hook to exposed position, and a spring acting to maintain the pivoted hook out of exposed position and maintain the guard in position protecting the fixed hook.

8. In an artificial bait, a body, a fixed hook, a movable hook, and a movable member mounted independently of the hooks and normally concealing the fixed hook and when operated exposing the said fixed hook and projecting the movable hook.

9. In an artificial bait, a body, a fixed hook, a pivoted hook, and a member pivoted independently of the pivoted hook and normally concealing the fixed hook and when operated exposing said fixed hook and projecting the pivoted hook.

10. In an artificial bait, a body, a fixed hook, a pivoted hook, and a pivoted and spring pressed guard having a projection on its inner face, said guard normally concealing the fixed hook and exposing said fixed hook and projecting the pivoted hook by the engagement of the projection therewith, when pressure is applied thereto.

GEORGE E. FENNER.